United States Patent [19]

DeRosa et al.

[11] Patent Number: 5,167,845
[45] Date of Patent: Dec. 1, 1992

[54] POLYMERIC ADDITIVES TO ENHANCE ANTI-WEAR, ANTI-OXIDANCY, AND DISPERSANCY IN LUBRICANTS

[75] Inventors: Thomas F. DeRosa, Passaic, N.J.; Rodney L. Sung, Fishkill, N.Y.; Benjamin J. Kaufman, Hopewell Junction, N.Y.; Rosemary J. Jennejahn, Nelsonville, N.Y.

[73] Assignee: Texaco Inc., White Plains, N.Y.

[21] Appl. No.: 631,531

[22] Filed: Dec. 21, 1990

[51] Int. Cl.$^5$ .......................................... C10M 151/02
[52] U.S. Cl. .................... 252/47.5; 525/256; 525/279; 525/280; 525/281; 525/301; 525/301.5; 525/331.7
[58] Field of Search ............... 525/256, 279, 280, 281, 525/301, 301.5, 331.7; 252/47.5

[56] References Cited

U.S. PATENT DOCUMENTS

| | | | |
|---|---|---|---|
| 4,219,432 | 8/1980 | Girgenti et al. | 525/301 |
| 4,517,104 | 5/1985 | Bloch et al. | 252/47.5 |
| 4,780,228 | 10/1988 | Gardiner et al. | 525/301 |

*Primary Examiner*—Ellen McAvoy
*Attorney, Agent, or Firm*—Robert A. Kulason; James J. O'Loughlin; Vincent A. Mallare

[57] ABSTRACT

A polymeric lubricant additive that behaves as a viscosity index improver and imparts enhanced anti-oxidancy, dispersnacy, and anti-wear properties to said lubricant oil has been prepared. The polymeric substrate is a random co- or terpolyer of ethylene propylene and a third monomer onto which an ethylenically unsaturated carboxylic acid or acid anhydride has been grafted. The polymer is imidized with aminoheterocyclics and hydroxylalkylated using an aldehyde or ketone an alkylation; than alkylated using mercaptoheterocyclics.

13 Claims, No Drawings

POLYMERIC ADDITIVES TO ENHANCE ANTI-WEAR, ANTI-OXIDANCY, AND DISPERSANCY IN LUBRICANTS

BACKGROUND OF THE INVENTION

This invention relates to lubricants, and more particularly to a functionalized polymeric lubricant additive which behaves as a viscosity index improver (VII) when added to lubricating oil. In addition, dissolution of this polymeric additive in lubricating oil imparts oxidative protection, enhanced dispersancy, and anti-wear properties to the lubricant.

DISCLOSURE STATEMENT

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethlenically-unsaturated carboxylic acid material followed by a reaction with a polyfunctional where the polymer backbone is an oil-soluble ethylene-propylene copolymer or an ethylene-propylene-diene modified terpolymer with a graft monomer of 2- or 4-vinylpyridine or N-vinylpyrrolidone to provide a dispersant VI improver for lubricating oils.

U.S. Pat. No. 4,320,019 discloses a multifunctional lubricating additive prepared by the reaction of an interpolymer of ethylene and a ($C_3$-$C_8$) alpha-monoolefin with an olefinic carboxylic acid acylating agent to form an acrylating reaction intermediate which is then reacted with an amine.

U.S. Pat. No. 4,340,689 discloses a process for grafting a functional organic group onto an ethylene-propylene copolymer or an ethylene-propylene-diene terpolymer.

U.S. Pat. No. 4,357,250 discloses a reaction product of a copolymer an olefin carboxylic acid via the "ene" reaction followed by a reaction with a mono-amine mixture.

U.S. Pat. No. 4,780,228 discloses the grafting of a hydrocarbon polymer in the absence of a solvent in the presence of a free radical initiator and a chain-stopped agent followed by a reaction with an amine, polyol or aminoalcohol.

U.S. Pat. No. 4,816,172 discloses the preparation of a polymeric lubricating oil additive that imparts both oxidative protection and enhanced dispersancy to lubricating oils.

U.S. Pat. No. 4,904,403 discloses a method of preparing anti-wear lubricating additives by incorporating a 1,3,4-thiadiazole nucleus.

The disclosures in the foregoing patents which relate to VI improvers and dispersants for lubricating oils, namely U.S. Pat. Nos. 3,522,180; 4,026,809; 4,089,794; 4,146,489; 4,259,540; 4,320,019; 4,340,689; 4,357,250; 4,780,689; 4,798,853; 4,816,172; and 4,904,403 are incorporated herein by reference.

An objective of this invention is to provide a novel graft copolymer composition that behaves as a viscosity index improver with enhanced anti-oxidancy, dispersancy, and anti-wear properties.

Another object of the invention is to provide a multi-functional lubricant additive effective for imparting anti-oxidancy, dispersancy and anti-wear properties to the lubricating oil composition.

A further object is to provide a novel lubricating oil composition containing the graft copolymer additive of the invention as well as to provide concentrates of the novel additive of the invention.

SUMMARY OF THE INVENTION

This invention provides a method for preparing a lubricant additive composition which comprises:

a) reacting a polymer prepared from ethylene and at least one ($C_3$-$C_{10}$) alpha-monoolefin and, optionally, a polyene selected from non-conjugated dienes and trienes comprising from about 15 to 80 mole percent of ethylene, from about 20 to 85 mole percent of said ($C_3$-$C_{10}$) alpha- monoolefin and from about 0 to about 15 mole percent of said polyene and having a number average molecular weight ranging from about 5,000 to about 500,000 with at least one olefinic carboxylic acid acylating agent to form one or more acrylating reaction intermediates having a carboxylic acid or acid anhydride acylating function within their structure;

b) reacting said acrylating reaction intermediate with a reactant selected from the group consisting of:

(i) an aminopyridine represented by the structural formula:

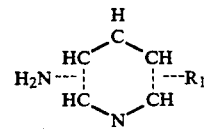

where $R_1$ represents hydrogen or a ($C_1$-$C_{10}$) alkyl radical selected from the group consisting of alkyl, alkenyl, alkoxyl, aralkyl alkaryl, hydroxyalkyl or aminoalkyl;

(ii) an N-phenylenediamine represented by the structural formula:

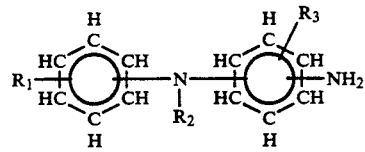

where $R_1$, $R_2$, and $R_3$ each are hydrogen or a ($C_1$-$C_{10}$) linear or branched hydrocarbon selected from the group consisting of alkyl, alkenyl, alkoxyl, aralkyl, alkaryl, hydroxylalkyl, and aminoalkyl;

(iii) an aldehyde or ketone represented by the structural formula:

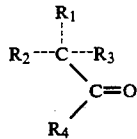

where $R_1$, $R_2$, and $R_3$ each are hydrogen or a ($C_1$–$C_{10}$) linear or branched hydrocarbon selected from the group consisting of alkyl, alkenyl, alkoxyl, aralkyl, alkaryl, hydroxyalkyl, and aminoalkyl, or a heteroatom selected from Group VIA or VIIA metals; $R_4$ is hydrogen or a ($C_1$–$C_{10}$) linear or branched hydrocarbon selected from the group consisting of alkyl, alkenyl, aralkyl, alkaryl, hydroxyalkyl, and aminoalkyl;

(iv) an amino-thiadiazole represented by the structural formula:

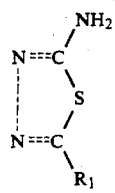

where $R_1$ is hydrogen or a ($C_1$–$C_{10}$) branched or linear hydrocarbon selected from the group consisting of alkyl, alkenyl, aralkyl, alkaryl, hydroxyalkyl, and aminoalkyl;

(v) a benzotriazole represented by the structural formula:

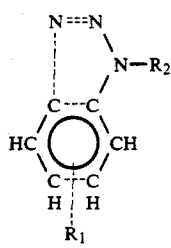

where $R_1$ and $R_2$ each are hydrogen or a ($C_1$–$C_{10}$) branched or linear hydrocarbon selected from the group consisting of alkyl, alkenyl, alkoxyl, aralkyl, alkaryl, hydroxyalkyl, and aminoalkyl;

(vi) a mercaptobenzothiazole represented by the structural formula:

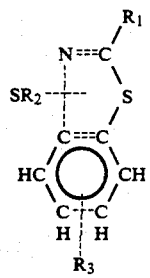

where $R_1$, $R_2$, and $R_3$ each are hydrogen or a ($C_1$–$C_{10}$) branched or selected from the group consisting of alkyl, alkenyl, alkoxyl, aralkyl, alkaryl, hydroxyalkyl, and aminoalkyl;

(vii) a mercaptothiazoline represented by the structural formula:

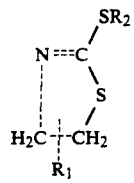

where $R_1$ and $R_2$ each are hydrogen or a ($C_1$–$C_{10}$) linear or branched hydrocarbon selected from the group consisting of alkyl, alkenyl, alkoxyl, aralkyl, alaryl, hydroxylalkyl, and aminoalkyl; and (viii) a mercaptobenzoimidazole represented by the structural formula:

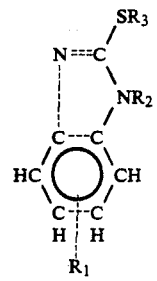

where $R_1$, $R_2$, and $R_3$ each are hydrogen or a ($C_1$–$C_{10}$) linear or branched hydrocarbon selected from the group consisting of alkyl, alkoxyl, alkenyl, alkaryl, aralkyl, hydroxyalkyl, and aminoalkyl to produce a polymeric additive composition product; and (c) recovering said polymeric additive composition product.

DETAILED DESCRIPTION OF THE INVENTION

The reaction product of the invention comprises a chemical modification of an ethylene co- or terpolymer of a ($C_3$–$C_{10}$) alpha-monoolefin containing a non-conjugated diene or triene termonomer onto which an ethylenically unsaturated acid anhydride and/or carboxylic acid function is grafted and subsequently imidized.

Materials selected as imidization agents are those having the following properties:

1 Imidization agent must possess intrinsic anti-oxidant properties
2) Imidization agent must possess ashless anti-wear properties.
3) Imidization agent must impart dispersant properties to its chemical environment.

Few imidization agents are able to conform to these stringent requirements, however.

It has been determined, however, that if the imidizating agent can be modified by halo- or hydroxyalkylation and a strategic material subsequently incorporated, then the above criteria can be routinely met. For example, if the initial imidization agent has ashless anti-wear properties, it is desirable to couple this material with one that possesses anti-oxidancy and dispersancy.

It has been further determined that if the imidization agent is a primary or secondary aromatic amine, halo- or hydroxylalkylation proceeds smoothly and in relatively high yield. More specifically, the imidization agent may be selected from the group consisting of:

(i) an aminopyridine represented by the structural formula:

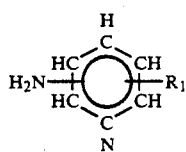

in which $R_1$ is hydrogen or a $(C_1-C_{10})$ branched or linear hydrocarbon selected from the group consisting of alkyl, alkenyl, alkoxyl, aralkyl, alkaryl, hydroxyalkyl, and aminoalkyl; and (ii) a N-phenylenediamine represented by the structural formula:

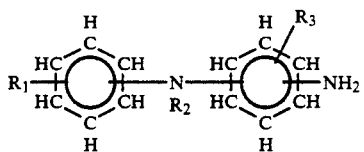

where $R_1$, $R_2$, and $R_3$ is hydrogen or a $(C_1-C_{10})$ linear or branched hydrocarbon selected from the group consisting of alkyl, alkenyl, alkoxyl, aralkyl, alkaryl, hydroxylalkyl, and aminoalkyl.

Halo- or hydroxylalkylation of polymeric substrates imidized with the aforementioned imidization agents occurs exclusively in the aromatic portion of the modified polymer or is restricted to the heteroatom portion of the molecule. The polymeric substrate does not behave as a reaction site for halo- or hydroxylalkylation. Aliphatic or aromatic aldehydes and ketones alone or in the presence of a hydrohalic acid or anhydrous hydrohalides may be used.

The aforementioned imidization agents that have been halo- or hydroxyalkylated are subsequently modified with a member selected from the group consisting of:

(i) an aminothiadiazole represented by the following formula:

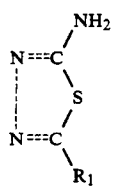

in which $R_1$ is hydrogen or a $(C_1-C_{10})$ branched or linear hydrocarbon selected from the group consisting of alkyl, alkenyl, alkoxyl, aralkyl, alkaryl, hydroxyalkyl, or aminoalkyl;

(ii) a benzotriazole represented by the following formula:

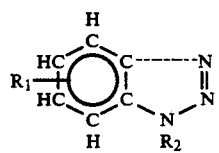

in which $R_1$ and $R_2$ each are hydrogen or a $(C_1-C_{10})$ branched or linear hydrocarbon selected from the group consisting of alkyl, alkenyl, alkoxyl, aralkyl, alkaryl, hydroxyalkyl, and aminoalkyl;

(iii) a mercaptobenzo-thiazole, represented by the following formula:

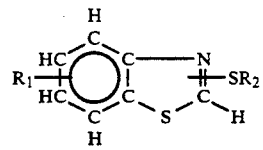

where $R_1$ and $R_2$ each are hydrogen or a $(C_1-C_{10})$ linear or branched hydrocarbon selected from the group consisting of alkyl, alkenyl, alkoxyl, aralkyl, alkaryl, hydroxyalkyl, and aminoalkyl;

(iv) a mercaptothiazoline represented by the formula:

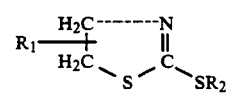

where $R_1$ and $R_2$ each are hydrogen or a $(C_1-C_{10})$ linear or branched hydrocarbon selected from the group consisting of alkyl, alkenyl, alkoxyl, aralkyl, alkaryl, hydroxyalkyl, and aminoalkyl; and (v) a mercaptobenzo-imidazole represented by the formula:

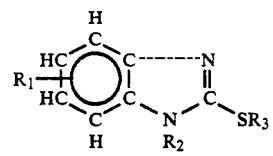

where $R_1$, $R_2$ and $R_3$ each are hydrogen or a $(C_1-C_{10})$ linear or branched hydrocarbon selected from the group consisting of alkyl, alkenyl, alkoxyl, aralkyl, alkaryl, hydroxyalkyl, or aminoalkyl.

The lubricant of the invention comprises an oil of lubricating viscosity and an effective amount of this novel reaction product. The lubricating oil will be characterized as behaving as a viscosity index improver with anti-wear, anti-oxidancy, and dispersancy properties.

Concentrates of the reaction product of the invention are also contemplated.

The polymeric substrate of this invention is a random co- or terpolymer prepared from ethylene or propylene or it may be prepared from ethylene and a higher olefin with the range of $(C_3-C_{10})$ alphaolefins. More complex polymer substrates, often called interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain.

Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene and 1,6 octadiene. A mixture of more than one diene can be used in the preparation of the interpolymer. A preferred non-conjugated diene for preparing a terpolymer or interpolymer substrate is 1, 4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro isodicyclo-pentadiene, and 2-(2-methylene-4-methyl-3-pentenyl)-[2.2.1] bicyclo-5-heptene.

The polymerization reaction to form the polymer substrate is generally carried out in the presence of a catalyst in a solvent medium.

The polymerization solvent may be any suitable inert organic solvent that is liquid under reactions conditions for solution polymerization of monoolefins which is generally conducted in the presence of a Ziegler-Natta type catalyst. Examples of satisfactory hydrocarbon solvents include straight chain paraffins having from 5-8 carbon atoms, with hexane being preferred. Aromatic hydrocarbon, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable.

The solvent selected may be a mixture of one or more of the foregoing hydrocarbons. It is desirable that the solvent be free of substances that will interfere with the Ziegler-Natta polymerization process.

These random polymeric materials used are substantially linear hydrocarbons. The nature of the monomer addition for the random co- or terpolymer generates an essentially saturated co- or terpolymer. The preparation of random co- or terepolymers utilized in this process is described as follows. In a typical preparation of a polymer hexane is first introduced into a reactor and the temperature in the reactor is raised moderately to about 30° C. Dry propylene is fed to the reactor until the pressure reaches about 40-45 inches of mercury. The pressure is then increased to about 60 inches of Hg and dry ethylene and 5-ethylidene-2-norbornene are fed to the reactor. The monomer feeds are stopped and a mixture of aluminum sesquichloride and vanadium oxytrichloride are added to initiate the polymerization reaction.

Completion of the polymerization reaction is evidenced by a drop in the pressure in the reactor.

Ethylene-propylene or higher alpha monoolefin copolymers may consist of from about 15 to 80 mole percent ethylene and from about 20 to 85 mole percent propylene or higher monoolefin with the preferred mole ratios being from about 45 to 80 mole percent ethylene and from about 20 to 55 mole percent of a ($C_3$ to $C_{10}$) alpha monoolefin.

Terpolymer variations of the foregoing polymers may contain from about 0.1 to 10 mole percent of a non-conjugated diene or triene.

The polymer substrate, that is the ethylene copolymer or terpolymer is an oil-soluble, substantially linear, rubbery material having a number average molecular weight from about 5,000 to 500,000 with a preferred number average molecular weight range of 25,000 to 250,000 and a most preferred range from about 50,000 to 50,000.

The terms polymer and copolymer are used generically to encompass ethylene copolymers, terpolymers or interpolymers. These materials may contain minor amounts of other olefinic monomers so long as their basic characteristics are not materially changed.

Polymer substrates or interpolymers are available commercially. Particularly useful are those containing from about 40 to 60 mole percent ethylene units and about 40 to 60 mole percent propylene units. Examples of such interpolymers are those sold under the tradenames of "Ortholeum 2052" and "PL-1256" by E.I. Dupont deNemours and Company of Wilmington, Del. The former is a terpolymer containing 48 mole percent ethylene units, 48 mole percent propylene units, and 4 mole percent 1,4-hexadiene units and having an overall inherent viscosity of 1.35. The latter is a similar polymer with an inherent viscosity of 1.95. The viscosity average molecular weights are these two materials are on the order of 200,000 and 280,000 amu, respectively.

Modification of these polymeric substrates is desirable since it generates reactive sites on these materials that are amenable to post-reactioning with strategically important monomers. Ethylenically unsaturated material containing pendant acid anhydride and carboxylic acid groups is grafted onto the polymer backbone. These materials which are attached to the polymer contain at least one ethylenic bond and a carboxylic acid or anhydride groups or a polar group which is convertible into a carboxyl group by oxidation or hydrolysis. Maleic anhydride or a derivative thereof is preferred. It grafts onto the block or random polymer to give two carboxylic acid functions or a single acid anhydride functionality. Examples of additional unsaturated carboxylic materials that are amenable to this grafting include chloromaleic anhydride, itaconic anhydride, or the corresponding dicarboxylic acid such as maleic acid, fumaric acid and their monoesters.

The ethylenically unsaturated carboxylic acid material may be grafted to these aforementioned block or random polymers in a number of ways. The modification may be performed by a process known as the "ene" reaction or by solution grafting using a free radical initiator. If the grafting utilizes a solvent, an inert hydrocarbon is preferred since it is inert and unreactive. Free radical initiators amenable to this process include peroxides, hydroperoxides, and azo compounds, especially those which have a boiling point greater than 100° C. and thermally decompose within the grafting temperature range to ensure an adequate supply of free radicals. Representative of these free radical initiators include, but are not limited to, azobutronitrile and 2,5-dimethyl-hex-3-yne-2,5-bis-t-butyl peroxide. The initiator is used in an amount between 0.005% to 2.0% by weight based on the weight of the reaction mixture. Typically the grafting reaction is performed at an elevated temperature in the range of about 100° C. to 250° C., preferably 120° C. to 190° C., and more preferably at 150° C. to 180° C., ie., above 160° C. Ideally, the grafting solvent is similar or identical to that used in the polymerization reaction and typically contains 40 wt % polymer based on the initial total oil solution.

Furthermore, to circumvent oxidative degradation of the polymeric substrate, grafting reactions are performed under an inert atmosphere. And, finally, if any component of the grafting procedure is especially volatile, the reaction may be performed in a enclosed vessel under moderate to high pressure using the aforementioned conditions and material requirements. In contrast, however, when the "ene" reaction is utilized as the grafting protocol, the reaction is typically performed without the use of a free radical initiator. Moreover, the reaction may be performed in the absence of any solvent and at elevated pressures to trap volatile components.

Finally, a grafting strategy best characterized as a hybrid of free radical solution grafting and thermal or "ene" reaction grafting is extruder or mastication grafting. In this design the unsaturated monomer or monomers are physically mixed with the polymer, with or without a charge of free radical initiator, and the mixture passed through a single or twin screw extruder at temperatures typically in the range of 150° C. to 400° C. The added charge of free radical initiator is to ensure an adequate supply of free radicals; however, in its absence more than one extruder pass may be performed to ensure high grafting levels.

The random co- or terpolymer or interpolymer intermediate possessing acid anhydride or carboxylic acid acrylating functions is imidized with an amino-heterocyclic compound which is:

a) an aminopyridine represented by the formula:

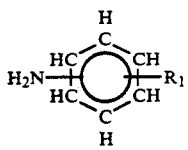

where $R_1$ is hydrogen, a $(C_1-C_{10})$ branched or linear hydrocarbon selected from the group consisting of alkyl, alkenyl, alkoxyl, aralkyl alkaryl, hydroxyalkyl or aminoalkyl; or b) an N-phenylenediamine represented by the structural formula:

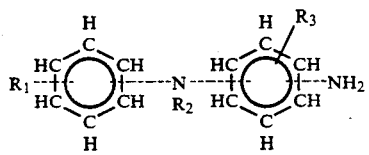

where $R_1$, $R_2$ and $R_3$ each are hydrogen or a $(C_1-C_{10})$ linear or branched hydrocarbon selected from the group consisting of alkyl, alkenyl, alkoxyl, aralkyl, alkaryl, hydroxylalkyl, and aminoalkyl.

The imidized polymeric intermediate is then halo- or hydroxylalkylated by reacting the precursor generated above with an aldehyde or ketone represented by the formula:

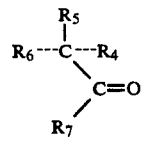

where $R_4$, $R_5$ and $R_6$ each are hydrogen or a Group VIA or VIIA metal; $R_7$ is hydrogen or a $(C_1-C_{10})$ linear or branched hydrocarbon selected from the group consisting of alkyl, alkenyl, alkoxyl, aralkyl, or alkaryl. This halo- or hydroxylalkylation may be performed alone or with the use of a catalyst.

Catalysts that are especially desirable to effect high yields of haloalkylation are anhydrous hydrohalides; for example, anhydrous hydrogen chloride, hydrogen bromide, or hydrogen iodide. Catalysts that may be employed to effect high yields of hydroxylalkylation are mineral acids, for example sulfuric acid and phosphoric acid; or by using mildly basic reaction conditions, for example using Group IIA oxides or hydroxides.

The halo- or hydroxylalkylated imidized intermediate may then be reacted with amino- or mercapto- heterocyclics or polycyclics selected from the group consisting of:

a) an aminothiadiazole represented by the following formula:

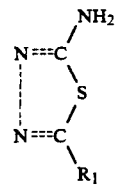

where $R_1$ is hydrogen or a $(C_1-C_{10})$ branched or linear hydrocarbon selected from the group consisting of alkyl, alkenyl, aralkyl, alkaryl, hydroxylalkyl, and aminoalkyl;

b) a benzotriazole represented by the formula:

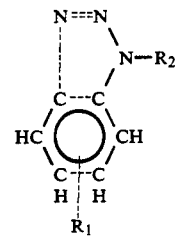

where $R_1$ and $R_2$ each are hydrogen or a $(C_1-C_{10})$ branched or linear hydrocarbon selected from the group consisting of alkyl, alkenyl, alkoxyl, aralkyl, alkaryl, hydroxylalkyl, and aminoalkyl;

c) a mercaptobenzothiazole represented by the formula:

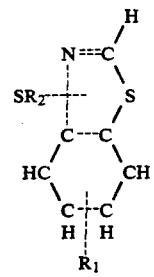

where $R_1$ and $R_2$ each are hydrogen or a $(C_1-C_{10})$ linear or branched hydrocarbon selected from the group consisting of alkyl, alkenyl, alkoxyl, aralkyl, alkaryl, hydroxylalkyl, and aminoalkyl;

d) a mercapto-thiazoline represented by the formula:

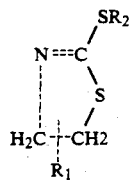

where $R_1$ and $R_2$ each are hydrogen or a ($C_1$–$C_{10}$) linear or branched hydrocarbon selected from the group consisting of alkyl, alkenyl, alkoxyl, alkaryl, aralkyl, hydroxylalkyl, and aminoalkyl; and e) a mercaptobenzoimidazole represented by the formula:

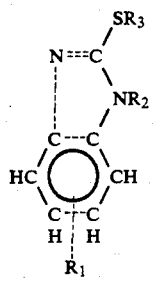

where $R_1$, $R_2$, and $R_3$ each are hydrogen or a ($C_1$–$C_{10}$) linear or branched hydrocarbon selected from the group consisting of alkyl, alkenyl, alkoxyl, aralkyl, alkaryl, hydroxylalkyl, and aminoalkyl.

The process for preparing these multifunctional viscosity index improvers involves charging diluent oil and solid grafted rubber, viz., EPSA, to the reaction flask and dissolving the rubber in oil at 160° C. under a blanket of nitrogen. The aminopyridine or N-phenylenediamine compound is then charged as a neat granular solid or as a 10–20% solution in an oil soluble solvent, such as commercial alkyl or alkylaryl polyethylene or polypropylene glycol. The imidization step of reacting the aminoaromatic with the polymer-bound succinic anhydride is carried out over several hours at the aforementioned temperature and under a protective nitrogen atmosphere. On completion of the iridization step, the material is cooled to 100° C. and screen filtered through a 100 mesh filter and the product isolated. These VI improvers obtained as imidization products of either EPSA or Kraton(R) are polymeric oil additives that impart viscosity index improvement to natural or synthetic oils in addition to thermal stability, enhanced dispersancy, and anti-wear properties.

The advantages of the present invention will be more clear from the following Examples and the results of the experiments carried out in the Examples and recorded below in Tables I, II, III and IV.

EXAMPLE I 60 grams of maleic anhydride graft ethylene-propylene copolymer rubber consisting of about 58 mole percent ethylene and 42 mole percent propylene and containing a number average molecular weight of 80,000 on which has been grafted 1 weight percent maleic anhydride was dissolved in 485 grams solvent neutral oil at 160° C. while the mixture was maintained under a nitrogen blanket along with mechanical stirring. After the polymer had dissolved, 0.35 grams of N-phenyl-p phenylenediamine were added neat and the reaction was permitted to continue for an additional 2 hours. The imidized copolymer was filtered through a 200 mesh screen and isolated, as poly [(ethylene-co-propylene)-g-N-phenyl-p-phenylene-maliimide].

EXAMPLE II

In this example, the procedure of Example I was used, except for the addition of the heat N-phenyl-p-phenylene-diamine, the added phenylene diamine was dissolved in Surfonic L-85 to produce poly [(ethylene-co-propylene)-g-N-phenyl-p-phenylene-maliimide].

EXAMPLE III

In this example, the procedure of Example I was used except for the addition of the neat N-phenyl-p-phenylene-diamine, the added phenylenediamine was dissolved in Surfonic L24-3 to produce poly [(ethylene-co-propylene)-g-N-phenyl-p-phenylene-maliimide].

EXAMPLE IV

In this example, instead of adding N-phenylenediamine as in Example I, 4.5 g of 2-Aminopyridine was added to produce poly [(ethylene-co-propylene)-g-2-pyridine-maliimide].

EXAMPLE V

In this example, instead of adding N-phenylene diamine as in Example 1, 0.45 g of 2-Aminopyridine dissolved in Surfonic L-85 was added to produce poly [(ethylene-co-propylene)-g-2-pyridine-maliimide].

EXAMPLE VI

In this example, instead of adding N-phenylenediamine as in Example 1, 0.45 g of 2-Aminopyridine dissolved in Surfonic N-100 was added to produce poly [(ethylene-co-propylene)-g-2-pyridine-maliimide].

EXAMPLE VII

In this example the polymeric imidization product using N-phenyl-p-phenylenediamine as the imidization agent was hydroxylmethylated using paraformaldehyde. Approximately 5 to 15 weight parts of neat paraformaldehyde were added to 100 weight parts of the reaction mixture obtained from Example 1. The reaction mixture was mechanically stirred at 140° C. for one hour under a nitrogen atmosphere to minimize polymeric oxidation, and the product resulted to hydroxymethylated-poly [(ethylene-co-propylene)-g-N-phenyl-p-phenylene-maliimide].

EXAMPLE VIII

In this example, 100 parts of the imidization product obtained from Example II was substituted to produce hydroxylmethylated-poly[(ethylene-co-propylene)-g-N-phenyl-p-phenylene-maliimide].

EXAMPLE IX

In this example, 100 parts of the imidization product obtained from Example III was substituted to produce hydroxylmethylated-poly [(ethylene-co-propylene)-g-N-phenyl -p-phenylene-maliimide].

EXAMPLE X

In this example, 100 parts of the imidization product obtained from Example IV was substituted in Example VII to produce hydroxylmethylated-poly [(ethylene-co-propylene)-g-2-pyridine-maliimidel].

EXAMPLE XI

In this example, 100 parts of the imidization product obtained from Example V was substituted in Example VII to produce hydroxylmethylated-poly [(ethylene-co-propylene)-g-2-pyridine-maliimide].

EXAMPLE XII

In this Example, 100 parts of the imidization product obtained from Example VI was substituted in Example VII to produce hydroxylmethylated-poly [(ethylene-co-propylene)-g-2-pyridine-maliimide].

EXAMPLE XIII

In this example, 100 parts of the hydroxylmethylated polymeric imidization product from Example VII was reacted further with 7 to 15 weight parts of 2-amino-thiadiazole to produce poly [(ethylene-co-propylene)-g-N-phenyl-p-phenylene-(N-methylene-benzotriazole)-maliimide].

EXAMPLE XIV

In this example, benzotriazole was substituted for the polymeric imidization product of Example VII to produce poly [(ethylene-co-propylene)-g-N-phenyl-p-phenylene-(N-methylene-benzotriazole)-maliimide].

EXAMPLE XV

In this example, 2-mercapto-benzothizole was substituted for the polymeric imidization product of Example VII to produce poly [(ethylene-co-propylene)-g-N-phenyl-p-phenylene-(methylene-2-mercapto-benzothizole)-maliimide].

EXAMPLE XVI

In this example, 2-mercapto-thiazoline was substituted for the polymeric imidization product of Example VII to produce poly [(ethylene-co-propylene)-g-N-phenyl-p-phenylene-(methylene-2-mercapto-thiazoline)-maliimide].

EXAMPLE XVII

In this example, 2-mercapto-benzimidazole was substituted for the polymeric imidization product of Example VII, to produce poly [(ethylene-co-propylene)-g-N-phenyl-p-phenylene-(methylene-2-mercapto-benzimidazole)-maliimide].

EXAMPLE XVIII

In this example, 2-amino-thiadiazole was used with the hydroxylmethylated imidization product from Example IX to produce poly [(ethylene-co-propylene)-g-2-pyridine-(-N-methylene-thiadiazole) -maliimide].

EXAMPLE XIX

In this example, benzotriazole was substituted for the hydroxylmethylated imidization product of Example X to produce poly [(ethylene-co-propylene)-g-2-pyridine-(N-methylene-benzotriazole)-maliimide].

EXAMPLE XX

In this example, 2-mercapto-benzothiazole was substituted for the hydroxylmethylated imidization product of Example X to produce poly [(ethylene-co-propylene)-g-2-pyridine-(methylene-2-mercapto-benzothiazole)-maliimide].

EXAMPLE XXI

In this example, 2-mercapto-thiazoline was substituted for the hydroxylmethylated imidization product of Example X to produce poly [(ethylene-co-propylene)-g-2-pyridine-(methylene-2-mercapto-thiazoline)-maliimide].

EXAMPLE XXII

In this example, 2-mercapto-benzimidazole was substituted for the hydroxylmethylated imidization product of example VII, to produce poly [(ethylene-co-propylene)-g-2-pyridine-(methylene-2-mercapto-benzimidazole)-maliimide].

The graft and derivatized polymer of the invention is useful as a polymeric additive for lubricating present oils. They are multifunctional additives for lubricants being effective as viscosity index improver that impart enhanced anti-wear, anti-oxidancy, and dispersancy properties to natural and synthetic lubricating oils and mixtures thereof. This novel polymeric additive can be employed in crankcase lubricating oils for spark-ignited and compression-ignited internal combustion engines. The compositions can also be used in gas engines, or turbines, automatic transmission fluids, gear lubricants, metal-working lubricants hydraulic fluids, and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 30 weight percent. A preferred concentration range for the additive is from about 1 to 15 weight percent based on the total weight of the oil composition.

Oil concentrates of the additive may contain from about 1 to 50 weight percent of the additive reaction product in a carrier or diluent oil of lubricating oil viscosity.

The novel reaction product of the reaction may be employed in lubricating oil compositions together with conventional lubricant additives. Such additives may include additional dispersants, detergents, anti-oxidants, pour point depressants, anti-wear agents and the like.

The dispersant properties of the additive-containing oil are determined in the Bench Sludge Test. Dispersancy of a lubricating oil is determined relative to three references which are the results from three standards blends tested with the unknown; test additives were blended into a formulated oil containing no dispersant. The additive reaction product was employed in the oil at a concentration of 12.0 weight percent polymer solution.

The product prepared in these examples was blended into formulations not containing dispersant to form 1.20 weight percent polymer solution. These blends were tested for dispersancy in the above test (Table I). In this test dispersancy is compared to that of three reference oils which are tested along with the experimental samples. Dispersant effectiveness is characterized as pass (P), marginal pass (MP), or fail (F).

TABLE I
BENCH SLUDGE TEST

| Additive | | Result |
|---|---|---|
| OCP Rubber | | Fail |
| [Poly(ethylene-co-propylene)] | | |
| EPSA | | Fail |
| Poly[(ethylene-co-propylene)-g-maleic anhydride] | | |
| Example I | Product | Pass |
| Example II | Product | Pass |
| Example III | Product | Pass |
| Example IV | Product | Pass |
| Example V | Product | Pass |
| Example VI | Product | Pass |
| Example XV | Product | Pass |
| Example XVI | Product | Pass |
| Example XVII | Product | Pass |
| Example XVIII | Product | Pass |
| Example XIX | Product | Pass |
| Example XX | Product | Pass |
| Example XXI | Product | Pass |
| Example XXII | Product | Pass |
| Commercial DOCP | Product | Pass |

The results from this test show that the subject of this invention gave consistently better dispersancy performance then the corresponding unmodified OCP rubber or non-imidized EPSA.

The antioxidant properties of the novel reaction product in a lubricating oil was determined in the bench oxidation test. In this test, 1.5 weight percent of the additive reaction product is blended into the solvent neutral oil (S.U.S. at 100° F. of 130). The mixture is continuously stirred while being heated accompanied by bubbling with air. Samples are periodically withdrawn for analysis by Differential Infrared Absorption (DIR) to observe changes in the intensity of the carbonyl vibration band at 1710 cm-1. A low carbonyl vibration band intensity indicates higher thermal-oxidative stability of the sample. Table II. summarizes the results of BOT testing.

TABLE II
BENCH OXIDATION TEST

| Additive | | Result |
|---|---|---|
| OCP Rubber | | >20 |
| Poly(ethylene-co-propylene) | | |
| EPSA | | >20 |
| (Poly(ethylene-co-propylene)-g-maleic anhydride) | | |
| Example I | Product | 4.1 |
| Example II | Product | 2.3 |
| Example XVII | Product | 5.3 |
| Commercial NVP grafted DOCP | | 15 |

The test data in Table II. demonstrate that substantal anti-oxidative properties result when modified with an anti-oxidant.

The novel reaction product of this invention is tested for its effectiveness as an anti-wear additive in formulated lubricating compositions.

The lubricating oil composition used in this testing is illustrated below in Table III.

TABLE III

| Component | Parts By Wgt |
|---|---|
| Solvent Neutral Oil A | 83.50 |
| Solvent Neutral Oil B | 5.00 |
| Product | 11.50 |

Oil A has a Sp. Gr. at 60/60 F of 0.858–0.868; Vis. E11° F. is 123–133 cPs; Pour Point is 0° F. Oil B has a Sp. Gr. at 60/60° F. of 0.871–0,88; Vis. E100° F. is 325–350 cPs; Pour Point is 10° F.

Anti-wear properties of the novel additive were evaluated using the Four Ball Wear Test, ASTM Test No. MS 82-79. In this test the oil is heated to 167° F. for 60 minutes at 600 RPM's under a 40 kg load. Anti-wear properties are assessed on the basis of scar diameters of standardized components. Reference oil samples containing unmodified ethylene-propylene copolymers or ethylene-propylene terpolymers are first evaluated so that a comparison with the chemically modified polymer may be performed. Results of the Four Ball Wear Testing are provided below in Table IV.

TABLE IV
FOUR BALL WEAR TEST

| Material | I | II Average Scar Diameter (mm) |
|---|---|---|
| OCP Rubber unmodified | | 0.77 |
| [(Poly(ethylene-co-propylene)] | | |
| EPSA | | 0.91 |
| (Poly(ethylene-co-propylene)-g-maleic anhydride) | | |
| Example I | Product | 0.53 |
| Example II | Product | 0.50 |
| Example III | Product | 0.57 |
| Example IV | Product | 0.51 |
| Example V | Product | 0.59 |
| Example VI | Product | 0.55 |
| Example XV | Product | 0.41 |
| Example XVI | Product | 0.39 |
| Example XVII | Product | 0.39 |
| Example XVIII | Product | 0.52 |
| Example XIX | Product | 0.40 |
| Example XX | Product | 0.32 |
| Example XXI | Product | 0.39 |
| Example XXII | Product | 0.35 |

It is immediately evident that dramatically improved wear resistance may be obtained by imidization of EPSA followed by hydroxylmethylation and post reaction with a variety of strategically important materials.

What is claimed:

1. A method for preparing a lubricant additive composition comprising:
   a) reacting about 100 parts of a polymer prepared from ethylene and at least one ($C_3$–$C_{10}$) alpha-monoolefin and, a polyene selected from non-conjugated dienes and trienes comprising from about 15 to 80 mole percent of ethylene, from about 20 to 85 mole percent of said ($C_3$–$C_{10}$) alpha-monoolefin and from about 0 to about 15 mole percent of said polyene and having a number average molecular weight ranging from about 5,000 to about 500,000 with about 1-5 parts of at least one olefinic carboxylic acid acylating agent at 160° C. for 2 hours to form one or more acrylating reaction intermediates having a carboxylic acid or acid anhydride acylating function within their structure;
   b) reacting said acrylating reaction intermediate with a reactant selected from the group consisting of:
      (i) a mercaptobenzothiazole represented by the structural formula:

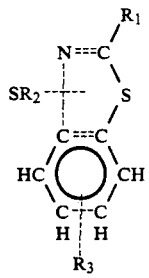

where $R_1$, $R_2$, and $R_3$ each are hydrogen or a ($C_1$–$C_{10}$) branched or selected from the group consisting of alkyl, alkenyl, alkoxyl, aralkyl, alkaryl, hydroxyalkyl, and aminoalkyl;

(ii) a mercaptothiazoline represented by the structural formula:

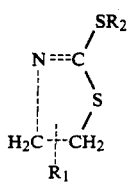

where $R_1$ an d$R_2$ each are hydrogen or a ($C_1$–$C_{10}$) linear or branched hydrocarbon selected from the group consisting of alkyl, alkenyl, alkoxyl, aralkyl, alaryl, hydroxylalkyl, and aminoalkyl; and (iii) a mercaptobenzoimidazole represented by the structural formula:

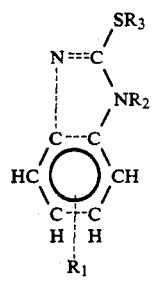

where $R_1$, $R_2$, and $R_3$ each are hydrogen or a ($C_1$–$C_{10}$) linear or branched hydrocarbon selected from the group consisting of alkyl, alkoxyl, alkenyl, alkaryl, aralkyl, hydroxyalkyl, and aminoalkyl to produce a polymeric additive composition product; and (c) recovering said polymeric additive composition product.

2. A method according to claim 1 in which said polymer has an average molecular weight ranging from about 25,000 to about 250,000.

3. A method according to claim 1 in which said polymer has an average molecular weight ranging from about 50,000 to about 150,000.

4. A method according to claim 1 in which said olefinic carboxylic acid acylating agent is maleic anhydride.

5. A method according to claim 1 in which said olefinic carboxylic acid acylating agent is itaconic anhydrode.

6. A method according to claim 1 in which said mercaptobenzothiazole is 2-mercaptobenzothiazole.

7. A method according to claim 1 in which said mercaptothiazoline is 2-mercaptothiazoline.

8. A method according to claim 1 in which said mercapto-benzoimidazole is 2-mercapto-benzoimidazole.

9. A concentrate for a lubricating oil comprising a diluent oil of lubrican tviscosity and from about 1 to 50 weight percent of the additive composition of claim 1 based on the total weight of the concentrate.

10. A lubricating oil composition comprising a major amount of an oil of lubricating viscosity and a minor amount effective to impart viscosity index improvement, anti-oxidant, dispersancy, and anti-wear properties to said oil of an additive composition prepared by the steps comprising:

a) reacting about 100 parts of a polymer prepared from ethylene and at least one ($C_1$–$C_{10}$) alpha-monoolefin and a polyene selected from non.conjugated dienes and trienes comprising from about 15 to 80 mole percent ethylene, about 20 to 85 mole percent of said ($C_1$–$C_{10}$) alpha-monoolefin and from about 0 to about 15 mole percent of said polyene, and having an average molecular weight ranging from about 5,000 to about 500,000 with about 1-5 parts of at least one olefinic carboxylic acid acylating agent at 160° C. for 2 hours to form one or more acrylating reaction intermediator having a carboxylic acid or acid anhydride acylating function within their structure;

b) reacting said acrylating reaction intermediate with a reactant selected from the group consisting of:

(i) a mercapto-benzothiazole represented by the structural formula:

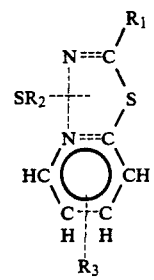

where $R_1$, $R_2$, and $R_3$ each are hydrogen or a ($C_1$–$C_{10}$) linear or branched hydrocarbon selected from the group consisting of alkyl, alkenyl, alkoxyl, alkaryl, aralkyl, hydroxyalkyl, and aminoalkyl;

(ii) a mercapto-thiazoline represented by the structural formula:

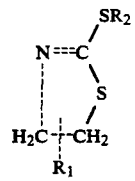

where $R_1$ and $R_2$ can be hydrogen or a ($C_1$–$C_{10}$) linear or branched hydrocarbon selected from the group consisting of alkyl, alkenyl, alkoxyl, alkaryl, aralkyl, hydroxyalkyl, and aminoalkyl; and (iii) a mercapto-benzoimidazole represented by the structural formula:

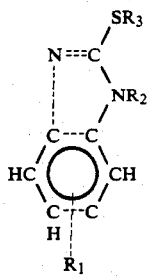

where $R_1$, $R_2$, and $R_3$ each are hydrogen or a $(C_1-C_{10})$ linear or branched hydrocarbon selected from the group consisting of alkyl, alkenyl, alkoxyl, alkaryl, aralkyl, aminoalkyl, and hydroxyalkyl, to produce a polymeric aditive composition product; and (c) recovering said polymeric additive composition product.

11. A lubricating oil composition according to claim in which said mercaptobenzothiazole is 2-mercaptobenzothiazole.

12. A lubricating oil composition according to claim 10 in which said mercaptothiazoline is 2-mercaptothiazoline.

13. A lubricating oil composition according to claim 10 in which said mercapto-benzoimidazole is 2-mercapto-benzoimidazole.

* * * * *